United States Patent [19]

Iyeta

[11] 4,317,190
[45] Feb. 23, 1982

[54] PICKUP ARM MOVEMENT CONTROL SYSTEM FOR RECORD PLAYER

[75] Inventor: Motoi Iyeta, Hamakita, Japan

[73] Assignee: Nippon Gakki Seizo Kabushiki Kaisha, Hamamatsu, Japan

[21] Appl. No.: 96,668

[22] Filed: Nov. 23, 1979

[30] Foreign Application Priority Data

Nov. 28, 1978 [JP]  Japan ................................ 53-146803

[51] Int. Cl.³ ............................................ G11B 17/06
[52] U.S. Cl. ...................................................... 369/33
[58] Field of Search ............... 274/9 RA, 13 R, 15 R, 274/23 A; 369/33

[56] References Cited

U.S. PATENT DOCUMENTS 3,993,315  11/1976  Hansen et al. ...................... 274/23 A
4,226,425  10/1980  Juso ..................................... 274/15 R

FOREIGN PATENT DOCUMENTS

965539  6/1957  Fed. Rep. of Germany .... 274/15 R

Primary Examiner—John W. Shepperd
Attorney, Agent, or Firm—Cushman, Darby & Cushman

[57] ABSTRACT

When a photoelectric detector in a record player is moved under the control of a signal supplied by a control circuitry in order to detect a required unmodulated space on a surface of a record disk to be played, a pickup arm is moved according to an output of a servo-amplifier so as to assume a position with respect to the record disk corresponding to a position assumed by the photoelectric detector. The servo-amplifier is inputted with two voltages related to the positions of the pickup arm and the photoelectric detector both relative to the record disk. After a required unmodulated space is detected, the pickup arm is switched over to be controlled of its movement in accordance with a signal delivered from the control circuitry, and will trace the record groove of the disk, while the movement of the photoelectric detector is controlled by an output of the servo-amplifier. Switching over from a former control mode to latter is carried out by the control circuitry in response to the output of the photoelectric detector.

10 Claims, 7 Drawing Figures

PICKUP ARM MOVEMENT CONTROL SYSTEM FOR RECORD PLAYER

BACKGROUND OF THE INVENTION (a) Field of the Invention

The present invention relates to an automatic record player, and more particularly it pertains to a pickup arm movement control system for use in an automatic record player to control the movement of the pickup arm.

(b) Description of the Prior Art

There have been proposed and practiced, in the past, a number of methods to materialize automatic performance of a record player. Such known methods include the use of a pickup arm head equipped with a specifically designed cartridge shell having an optical device incorporated therein to optically detect unmodulated spaces formed on a surface of a record disk where no sound track is present. Such cartridge shell is operative so that, upon receipt of an output from this optical device, a control unit which is provided on the record player starts controlling operations for driving specific members, such as the pickup arm, the pickup arm lifter and other parts of the record player. This type of prior art record player, however, has disadvantages in that it requires such a specially designed pickup cartridge equipped with the above-mentioned optical device for performing the intended automatic operations including uplifting as well as descending movements of the pickup arm and also programmed movements of the pickup arm. By the use of other ordinary types of pickup cartridge not provided with such optical device, however, the record player will no longer be able to make automatic performances.

SUMMARY OF THE INVENTION

It is, therefore, a general object of the present invention to provide an improved automatic record player which eliminates those inconveniences mentioned above encountered in conventional automatic record players.

Another object of the present invention is to provide an improved automatic record player of the type described above, which can perform desired automatic operations by the use of any ordinary type pickup cartridge instead of the use of such specifically designed pickup cartridge as described above.

A further object of the present invention is to provide a pickup arm movement control system which is suitable for use in an automatic record player of the type described above, and which satisfies the above-mentioned objects.

According to the present invention, there is provided a pickup arm movement control system for controlling the movement of a pickup arm of a record player, which system comprises, in combination: first driving means for driving said pickup arm to move it through a predetermined course of movement relative to a turntable of said record player; photoelectric means for optically detecting unmodulated spaces formed on a surface of a record disk which is placed on the turntable; second driving means for driving said photoelectric means to move it through another predetermined course of movement relative to the turntable; first position detecting means for detecting the position of the pickup arm relative to the turntable and producing a first signal related with this detected relative position of said pickup arm; second position detecting means for detecting the position of said photoelectric means relative to the turntable and producing a second signal related with this detected relative position of said photoelectric means; circuit means for receiving the first and second signals from said first and second position detecting means and producing a third signal representing the difference between the first and second signal received; switching means for directing the third signal produced by said circuit means to selected one of said first and second driving means; pickup arm lifter means for holding said pickup arm at a lifted-up position off the surface of the record disk and allowing the pickup arm to descend onto the surface of the record disk; and control means associated with said photoelectric means for producing control signals to control the operation of the members, i.e. said first driving means, said second driving means, said switching means and said pickup arm lifter means, said pickup arm control system being operative so that, when said first driving means is supplied with a control signal from said control means to drive said pickup arm, said second driving means is also supplied with the third signal from the circuit means via said switching means so that the photoelectric means is controlled of its movement by said second driving means to assume a position relative to said turntable corresponding to a position assumed by the pickup arm, and when said second driving means is supplied with a control signal from said control means to drive said photoelectric means, the first driving means is supplied with the third signal from the circuit means via said switching means so that the pickup arm is controlled of its movement by said first driving means to assume a position relative to said turntable corresponding to a position assumed by said photoelectric means.

These and other objects as well as the features and the advantages of the present invention will be apparent from the following detailed description of the preferred embodiments of the present invention when taken in conjunction with the accompanying drawings.

BRIEF DESCRIPTION OF THE DRAWINGS

Throughout the drawings, like parts are indicated by like reference numerals and symbols.

DETAILED DESCRIPTION OF THE PREFERRED EMBODIMENTS

A basic arrangement of a pickup-arm movement control system of the present invention for employment in an automatic linear-tracking type record player will be described by reference to FIG. 1 prior to describing embodiments of the present invention.

Figure 1:
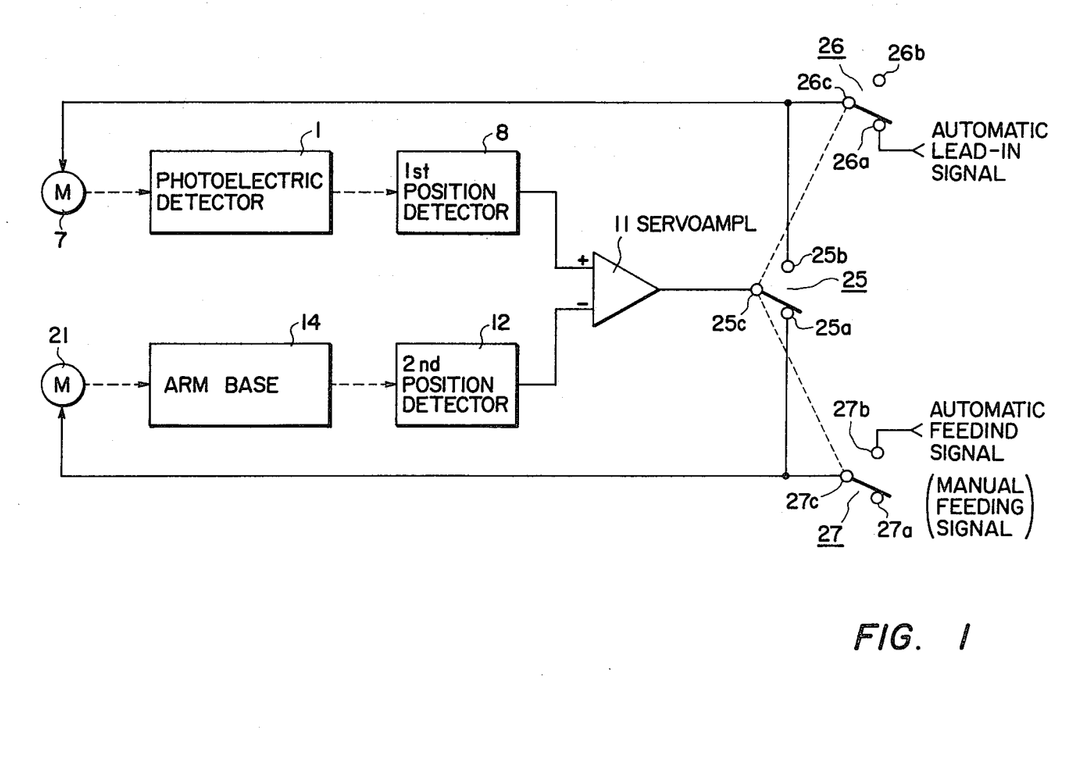
FIG. 1 is a diagramatic block diagram showing a basic arrangement of a pickup arm movement control system, to indicate the principle of the present invention.

In FIG. 1, numeral 1 denotes a photoelectric detector. This detector 1 is adapted to be moved in accordance with the rotation of a motor 7 over a turntable (not shown) of a record player in order to optically detect unmodulated spaces provided on a surface of a record disk placed on the turntable. The above-mentioned unmodulated spaces are formed on a disk where there is no sound track and which is a mere groove containing no signal. Numeral 8 indicates a first position detector assigned for detecting the position of the photoelectric detector 1 relative to the turntable and for producing a first output voltage related to this relative position thus detected. This output voltage is inputted to one of the two input terminals of a servo-amplifier 11 which may comprise a differential amplifier. Numeral 14 indicates an arm base member or arm carriage on which a pickup arm 22 is supported. This arm carriage 14 is arranged to move in the direction of movements of the pickup arm 22. More particularly, this arm carriage 14 is driven by its associated motor 21 to move in a direction of the course of movements of the pickup arm 22 which it carries, while serving to keep the pickup arm always tangential to the signal groove formed in the surface of the disk. For the purpose of detecting the position of the pickup arm relative to the surface of the record disk placed on the turntable, there is provided a second position detector 12 on this arm carriage 14, and this second position detector 12 generates a second output voltage which is representative of the relative position detected, and this output voltage is inputted to the other input of the servo-amplifier 11. This servo-amplifier 11 outputs a voltage representative of the difference between the first and the second input voltages supplied from the first and the second position detectors 1 and 12. This output voltage from the servo-amplifier 11 is transmitted to the common movable contact 25c of a selector switch generally indicated at 25, and this contact 25c is connected to the output terminal of the servo-amplifier 11. Said output voltage is supplied via respective fixed contacts 25a or 25b, to the motor 7 or the motor 21. The motor 7 is coupled to the movable contact 26c of a selector switch generally indicated at 26, and is adapted to be connected to a fixed contact 26a which, in turn, is adapted to receive an automatic lead-in signal supplied from control circuitry (not shown) incorporated in the record player. The motor 21 is connected to the movable contact 27c of a third selector switch generally indicated at 27 which has two fixed contacts 27a and 27b. The fixed contact 27b is supplied with an automatic feeding signal supplied from the control circuitry. This automatic feeding signal is a voltage signal related to an offset angle which may be formed, during the tracing operation of the pickup arm, between the direction tangential to the record groove and the direction of the longitudinal axis of the pickup arm. Here, the fixed contacts 26b and 27a of the selector switches 26 and 27 are to be understood to receive no external signal.

These selector switches 25, 26 and 27 are ganged to each other with such mutual relationships as shown in the following Table 1.

TABLE 1

| Selector switches | Positions of movable contacts | |
|---|---|---|
| | Case I | Case II |
| 25 | 25a | 25b |
| 26 | 26a | 26b |
| 27 | 27a | 27b |

The operation of the above-described system of the invention will be explained below.

Let us now suppose first the instance wherein it is intended to bring the pickup arm from its rest position located away from the turntable onto the lead-in groove of the unmodulated space provided at the outermost peripheral portion on a surface of the record disk placed on the turntable to start the playing of the record disk 3 at the very beginning of the record. To this end, the selector switches 25, 26 and 27 are set for Case I in Table 1. Then the automatic lead-in signal is delivered out from the control circuitry in the player. This automatic lead-in signal, which is a dc voltage, is supplied via the selector switch 26 to the motor 7 for driving same. Thus, the motor 7 starts rotation, causing the photoelectric detector 1 to move toward the center of the record disk. The position of the photoelectric detector 1 relative to the record disk is constantly detected by the first position detector 8, which supplies its output voltage representative of the relative position thus detected to the associated one of the two input terminals of the servo-amplifier 11 whose other input terminal is applied with an output voltage from the second position detector 12. The output of the servo-amplifier 11, which represents the difference between the relative positions of the detector 1 and the pickup arm, relative to the record disk, is fed to the motor 21 via the selector switch 25 set for Case I. Hence, the arm carriage 14 is driven by the motor 21 to move toward the center of the record disk. Namely, a servo-control system, which comprises the servo-amplifier 11, the motor 21, the arm carriage 14 and the detector 12, controls the movement of the pickup arm 22 so that the pickup arm will always assume a position relative to the record disk 3 corresponding to a position of the photoelectric detector 1 relative to the record disk 3.

Thereafter, when the photoelectric detector 1 reaches the outermost unmodulated space on the outermost peripheral portion on the surface of the record disk and detects it, this detector 1 generates a detection signal. At such time, the pickup arm 22 is also located above this unmodulated space, i.e. the lead-in position of the disk. With this generation of the detection signal, the control circuitry in the record player changes over the connection of the selector switches 25, 26 and 27 to positions for Case II, and also energizes the arm lifter (not shown). The arm lifter, therefore, is urged to move downwardly so that the pickup arm is caused to descend gently onto the surface of the record disk together with this arm lifter. Thus, the lead-in operation of the pickup arm onto the lead-in groove of the record disk is accomplished, and the pickup cartridge 24 carried on the cartridge shell 23 of the pickup arm 22 at the foremost end of the latter is ready for tracing the record groove. It should be noted that, during the period of the lead-in operation of the pickup arm, the latter is held in an up-lifted position off the record disk by the aforementioned pickup arm lifter.

During the tracing of the record groove, the movement of the pickup arm 22 is controlled by the signal supplied from the control circuitry in the record player, in such manner that the pickup arm is kept always tangential to the groove of the record disk 3. That is, the pickup arm tends to be urged to move toward the center of the record disk with the rotation of this record disk, forming a trifle offset angle between the axial direction of the pickup arm and the tangential direction relative to the record groove. This offset angle is detected by an associated means (not shown) so that the automatic feeding signal is supplied to cancel this offset angle. Through this pickup arm feeding control, the pickup arm 22 is caused to move smoothly toward the center of the record disk, keeping a direction tangential to the record groove and in synchronism with the rotation of the record disk. On the other hand, the movement of the pickup arm 22 is detected by the second position detector 12, and a related output voltage thereof is inputted to the servo-amplifier 11. Also, the output of this servo-amplifier 11 is supplied via the selector switch 25 to the motor 7 for driving the photoelectric detector 1. Thus, the photoelectric detector 1 is controlled of its movement so that coincidence between the two input voltages to the servo-amplifier 11 is always established. That is, the photoelectric detector 1 is controlled of its movement so as to assume a same relative position as the position of the pickup arm.

Of course, the pickup arm movement control system of the present invention also allows manual control of the movement of the pickup arm. To perform such manual-mode operation, the selector switches 25, 26 and 27 are set for Case II, and a manual feeding signal is supplied from the control circuitry of the record player to the fixed contact 27b instead of the automatic feeding signal in automatic record playing. The motor 21 is driven by a manual feeding signal to rotate in a direction depending on the polarity of the signal, which signal being a positive or a negative dc voltage. Thus, the pickup arm 22 is carried along to a desired position on the record disk 3 either toward the center of the record disk or toward the outer periphery thereof. During the manual feeding of the pickup arm, of course, the pickup arm 22 is held in its uplifted position off the record disk 3 by the pickup arm lifter means not shown. Upon reaching a required position, the pickup arm is caused by the pickup arm lifter means to descend onto the surface of the record disk 3, and at the same time, an automatic drive signal, in turn, is supplied to the fixed contact 27b of the selector switch 27 for the automatic feeding of the pickup arm to play the record disk. During the manual feeding, the photoelectric detector 1 is controlled of its movement to assume a position corresponding to the position assumed by the pickup arm 22, by the servo-control mechanism formed by the members 1, 7, 8 and 11.

As will be readily understood from the description stated above, the pickup arm movement control system of the present invention features the servo-control mechanism which controls the movement of the pickup arm 22 and the photoelectric detector 1 which is separated from the pickup arm, so that the former is moved following the latter and vice versa, and therefore it is extremely suitable for full automatic performances including program-controlled playing of the record player. As is obvious, the system of the present invention does not require any special type of pickup cartridge, since the photoelectric detector is a means separate from the pickup arm of the record player.

Next, a concrete embodiment of a pickup arm movement control system according to the present invention will be described in connection with FIGS. 2 and 3.

Figure 3:
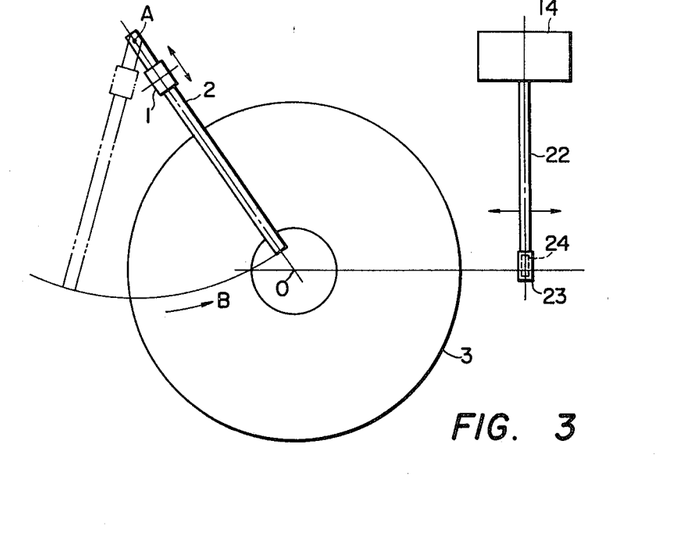
FIG. 3 is an explanatory illustration, showing the positional relationship of a photoelectric detector and a pickup arm which are employed in the embodiment of FIG. 2.

The instant embodiment is designed to be suitable for an automatic record player of linear tracking type, and a pickup arrangement of which is explanatorily shown in FIG. 3. In the Figure, an arm base or carriage 14 is movable, carrying a pickup arm 22, in a direction linear and perpendicular to a tangential direction of the record groove of a record disk 3 placed on a turntable (not shown). The pickup arm 22 is provided, at its foremost end, with a cartridge holder or shell 23 in which a pickup cartridge 24 is attached. The photoelectric detector 1 as previously described is slidably mounted on a lever 2 which is horizontally swingable around its supporting shaft or fulcrum A. The photoelectric detector 1 consists of a light source for projecting a light beam onto the record surface, and of a light-sensor for receiving and detecting the light rays reflected back from the record surface. The light source may comprise a light-emitting diode, a driver circuit switching, at a high rate, the driving current of this diode, and a lens focusing the light rays emitting from the diode onto the record surface in a form of a beam. The light sensor may be composed of a photo-sensitive element such as a photocell, and a combination of a slit and a focusing lens. The light sensor further may include an electrical filter through which only the desired frequency components of the output of the light-sensitive element is delivered out. The lever 2 is arranged so that it is moved from a position shown by the imaginary lines to another position shown by solid lines before the starting of an automatic playing of the record player.

Figure 2:
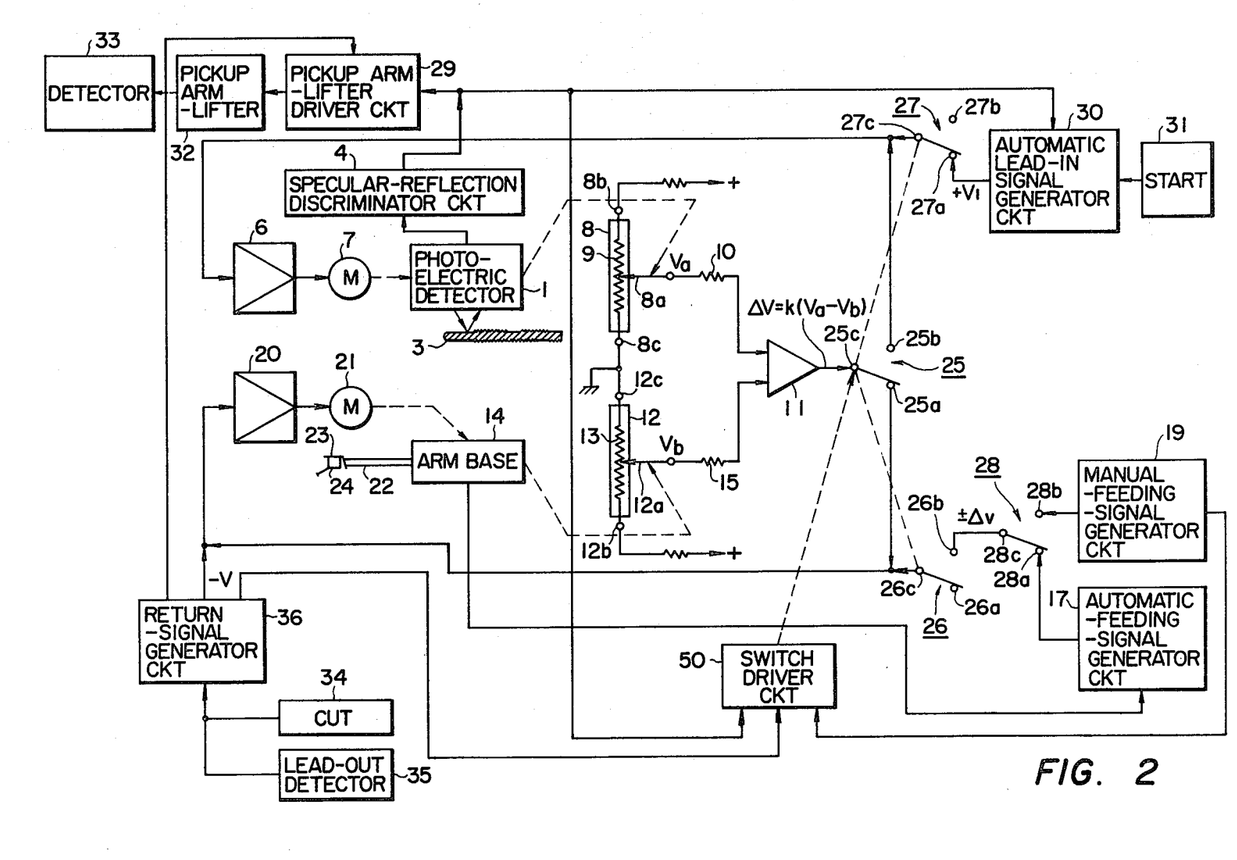
FIG. 2 is a block diagram showing a concrete embodiment of pickup arm movement control system according to the present invention, suitable for a linear tracking type automatic record player.

Referring to FIG. 2, the output signal of the photoelectric detector 1 is fed to a specular-reflection discriminator circuit 4 whose output signal is supplied to a pickup arm lifter driver circuit 29 and also to an automatic lead-in signal generator circuit 30. This circuit 30 is constructed so that, upon receipt of a signal from a START button switch 31, it starts generation of an automatic lead-in signal (a constant dc voltage, $+V_1$). This signal is de-energized when the circuit 4 detects, based upon the output of the detector 1, the occurrence of a specular reflection from the record surface and energizes an output signal of this circuit 4. The specular reflection means a reflection from the unmodulated space on the record disk surface which has a larger reflecting rate than do the modulated groove portions. The automatic lead-in signal from the circuit 30 is applied to the fixed contact 27a of the selector switch 27.

With the energization of an output signal of the circuit 4, the pickup arm lifter driver circuit 29 delivers a driving signal to cause the pickup arm lifter 32 to move downwardly. This driving signal is de-energized when the circuit 29 is supplied with a signal from a return-signal generator circuit 36. In the absence of said driving signal from the driven circuit 29, the pickup arm lifter 32 is held at its uplifted position by the action of a built-in activating means. To the pickup arm lifter 32 is mechanically coupled a detector 33 for detecting whether or not the pickup arm lifter 32 is at its uplifted position. THe movable contact 27c of the selector switch 27 is coupled to the input terminal of a driver amplifier 6 for driving the motor 6, and further to the fixed contact 25b of the selector switch 25 at this stage.

The position detector 8 for detecting the position of the photoelectric detector 1 comprises a potentiometer 8 which has a terminal 8b connected, via a resistor, to a positive potential, another terminal 8c grounded, and a slider tap 8a movable in slidable contact with a resistor element 9 having its opposite ends connected with the terminals 8b and 8c. The slider tap 8a of the potentiometer 8 is ganged to the photoelectric detector 1 so that the slider tap 8a is allowed to slide in accordance with the movement of the detector 1. Hence, a dc voltage $V_a$ representing the relative position of the detector 1 with respect to the record disk 3 is derived at the slider tap 8a. This voltage $V_a$ is applied, via a resistor 10, to one of the input terminals of the servo-amplifier 11. Similarly, the other position detector 12 for detecting the position of the pickup arm 22 comprises another potentiometer which consists of a resistor element 13, a slider tap 12a which is in slidable contact with the resistor element 13, a terminal 12b connected to an end of the resistor element 13 and also to a positive potential via a resistor, and another terminal 12c connected to another end of the resistor element 13 and grounded. The slider tap 12a of the potentiometer 12 is ganged to the arm carriage 14 and accordingly to the pickup arm 22. As such, at the slider tap 12a is derived a dc voltage $V_b$ representing the position of the pickup arm 22 with respect to the record disk 3. This voltage $V_b$ is fed, via a resistor 15, to the other input terminal of the servo-amplifier 11.

Numeral 20 represents a driver amplifier for driving the motor 21. To this driver amplifier 20 is supplied a return signal from the return signal generator circuit 36. This circuit 36 is arranged to energize the return signal, which is a negative dc voltage ($-V$), when it is initiated by a signal from either a CUT button switch 34 or a lead-out groove detector 35. The input of the driver amplifier 20 is also coupled to the fixed contact 25a of the selector switch 25 and the movable contact 26c of the selector switch 26. The fixed contact 26b of the selector switch 26 is connected to the movable contact 28c of a fourth selector switch 28. The fixed contact 28a is supplied with an automatic feeding signal delivered from an automatic-feeding-signal generator circuit 17 which operates in association with means (not shown) provided on the arm base 14 for detecting an offset angle assumed by the pickup arm 22 relative to a tangential direction of the record groove. The automatic feeding signal is a dc voltage ($\pm \Delta V$) required to drive the motor 21, via the amplifier 20, in such direction that the arm carriage 14 is moved to reduce the offset angle to zero. Another fixed contact 28b of the selector switch 28 is supplied with a manual feeding signal from a manual-feeding-signal generator circuit 19. This manual feeding signal is for manually feeding the pickup arm 22 to a desired position and it is a dc voltage. As such, there is supplied to the contact 26b of the selector switch 26 either an automatic feeding signal or a manual feeding signal, depending on the position of the selector switch 28. During the period of the automatic playing mode, the movable contact 28c is connected to the contact 28a, whereas during the period of the manual mode, the movable contact 28c is connected to the contact 28b. The servo-amplifier 11 produces an output voltage, $\Delta V = k(V_a - V_b)$, wherein k is a constant. This output voltage is fed to the movable contact 25c of the selector switch 25. The selector switches 25, 26 and 27 are in such ganged relationship as shown in Table 1, and they are driven by a switch driver circuit 50. The respective selector switches may be mechanical switches, or electrical switching devices or circuits.

Figure 4:
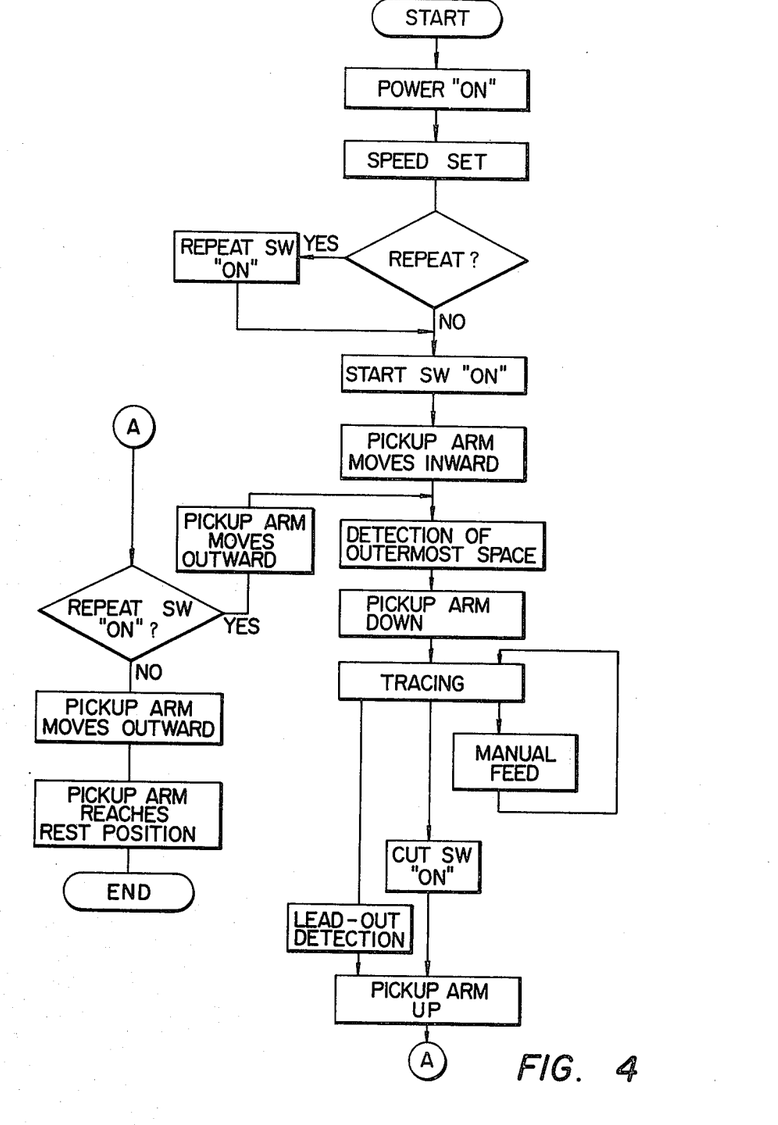
FIG. 4 is a flow chart for explaining selective operations performed by the embodiment shown in FIGS. 2 and 3.

Now, the operation of this instant embodiment of the present invention will be explained by referring to a flow-chart of FIG. 4.

To start an automatic playing of a record disk on the record player, only a mere depression of the START button switch 31 is required after turning a power switch of the player "on" as well as setting the rate or rotation of the turntable.

Upon depression of the START button switch 31, the lever 2 which then is positioned at the imaginary lines in FIG. 3 will be moved in a direction B (see FIG. 3) by an associated actuating means (not shown), to a position shown by solid lines (see FIG. 3). The pickup arm lifter 32 is at its uplifted position. The automatic lead-in signal ($+V$) is energized at the circuit 30, and is supplied to the driver amplifier 6 for driving the motor 7 because the selector switches 25, 26 and 27 are, here, set for Case I. The motor 7 is driven to rotate in the forward direction, so that the photoelectric detector 1 is moved along the lever 2 toward the center point O of the turntable or the disk to be played. The position-detecting potentiometer 8 has its slider tap 8a moved in accordance with the movement of the photoelectric detector 1, so that it outputs a voltage $V_a$ related to the relative position of the detector 1 with respect to the turntable. Similarly, the other potentiometer 12 produces, at its slider tap 12a, a voltage $V_b$ related to the position of the pickup arm 22 relative to the record disk 3. A voltage proportional to the difference between these two voltages $V_a$ and $V_b$ is delivered out from the servo-amplifier 11 and is supplied to the motor driver circuit 20 via the selector switch 25 which is now set for Case I. In this process, the motor 21 is driven to rotate in the forward direction so as to cause the pickup arm carriage 14 to travel in direction C (see FIG. 3), carrying the pickup arm 22 along therewith. Thus, the pickup arm 22 is carried so as to follow the movement of the photoelectric detector 1. More particularly, the pickup arm 22 is moved in such direction as indicated by the output voltage of the servo-amplifier 11 progressively approaching zero volt. In other words, the pickup arm 22 is controlled of its movement to assume the same relative position as that assumed by the photoelectric detector 1, with respect to the turntable.

Thereafter, when the photoelectric detector 1 reaches the outermost unmodulated space at the outermost peripheral portion on a surface of the record disk, a specular or regular reflection of light occurs because said unmodulated space contains no modulations of sound signals and has a glossy surface. Such specular reflection of light reflected from the record surface will result in an appreciable increase in the output level of the photoelectric detector 1, as compared with cases where there is the detector 1 above the sound track portions of the record disk which present a relatively rough surface, and which tend to bring about a diffused reflection of light therefrom. Such increase in the output level of the photoelectric detector 1 is discriminated by the specular-reflection discriminator circuit 4, so that it energizes its output signal. Then, the supply of the automatic feeding signal at the circuit 30 is stopped, so that the motor 7 is stopped of its rotation. Almost immediately therewith, the pickup arm lifter driver circuit 29 starts driving of the pickup arm lifter means 32, and accordingly the pickup arm lifter moves downwardly, causing the pickup arm 22 to gently descend onto the surface of the record disk. Also the energization of the output signal of the circuit 4 causes the switch driver circuit 50 to changeover the connections of the selector switches 25, 26 and 27 to positions for Case II. Thus, the automatic lead-in operation of the pickup arm 22 onto the surface of the record disk is accomplished, and the record player is now ready for tracking the sound groove of the record disk 3.

Figure 5:
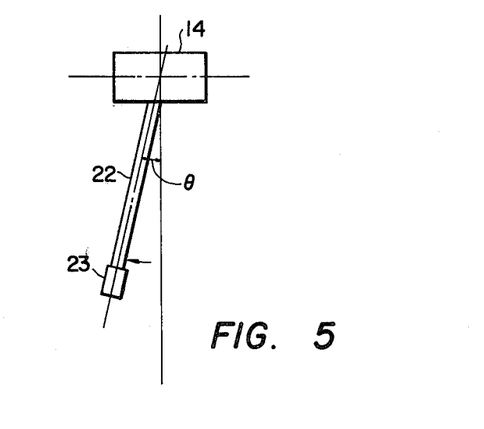
FIG. 5 is an illustration to explain the movement mechanism of the pickup arm and the pickup arm carriage in connection with FIG. 1.

During the tracing of the sound groove of the record disk, the pickup arm cartridge 24 travels toward the center of the record disk in accordance with the rotation of this record disk, and therefore the pickup arm 22 tends to be deflected from the tangential direction of the record groove to produce a trifle offset angle $\theta$ (see FIG. 5). This offset angle is detected by means (not shown) on the arm carriage 14, and the automatic feeding signal related to the offset angle detected is supplied from the automatic-feeding-signal generator circuit 17 to the motor driver circuit 20. The arm carriage 14 is thus moved by the motor 21 in such direction as will correct this offset angle to be minimized. In this way, the pickup arm 22 is automatically moved in synchronism with the rotation of the record disk, while being held substantially tangential to the record groove. During the period of tracing, the relative position of the pickup arm 22 with respect to the turntable or record disk 3 is constantly detected by the position-detecting potentiometer 12, and the resulting output voltage is inputted to the servo-amplifier 11. Because of the selector switch 25 being set for Case II, the photoelectric detector 1 is automatically controlled of its movement by the servo-control mechanism composed of the members 1, 6, 7, 8 and 11, so as to establish a coincidence between the relative positions of the detector 1 and the pickup arm 22.

When the pickup cartridge 24 reaches the innermost unmodulated space, i.e. the lead-out position on the record disk, and when this fact is detected by the lead-out detector 35 associated with the arm carriage 14, or when the CUT button switch 34 is depressed during the midst of tracing by the pickup arm, the record player will operate to return the pickup arm 22 back to its initial rest position, in a manner described below.

Upon receipt of a signal generated by either the circuit 36 or the CUT button switch 34, the return-signal generator circuit 36 delivers out a signal to direct the pickup arm lifter driver circuit 29 to cease the driving of the pickup arm lifter 32, so that this lifter 32 ascends and lifts the pickup arm 22 upwardly off the surface of the record disk. This circuit 36 also supplies another signal to cause the switch driver circuit 50 to hold the selector switches 25, 26 and 27 at positions for Case II. A little bit later, the return signal which is a negative dc voltage $(-V)$ is energized at the circuit 36, so that the motor 21 is caused to rotate in the reverse direction, causing the pickup arm 22 to return back to its rest position. This movement of the pickup arm 22 is detected by the position-detecting potentiometer 12 and transmitted to the motor 7 by way of the servo-amplifier 11 and also the motor driver amplifier 6. Thus, the photoelectric detector 1 is also returned, along the lever 2, back to its initial position, following the movement of the pickup arm 22. When the pickup arm arrives at its rest position, this arrival is detected by means (not shown), so that return signal is de-energized at the circuit 36, and also that the lever 2 is returned to the position shown by the imaginary lines in FIG. 3. At the same time therewith, the selector switches 25, 26 and 27 are re-set for Case I by the driver circuit 50. As such, the automatic return operation of the pickup arm 22 is accomplished.

Next, manual control of the movement of the pickup arm will be explained hereunder. In case, for example, the pickup arm is required to be altered of its position during the midst of tracing of the record groove, a manipulation means (not shown) associated with the manual-feeding-signal generator circuit 19 and the selector switch 28 is manipulated. With this manipulation, the pickup arm lifter driver circuit 29 stops the driving of the pickup arm lifter 32, so that this lifter 32 ascends to uplift the pickup arm 22 off the record disk surface. The selector switches 25, 26 and 27 are then still held at positions for Case II by the circuit 50 in response to a signal applied thereto from the circuit 19. Also, the movable contact 28c of the selector switch 28 is positioned at the fixed contact 28b. Hence, the manual feeding signal, which has a polarity and magnitude dependent respectively on the direction and the speed of the manipulation by the operator, is supplied from the circuit 19 to the motor driver circuit 20 via the selector switches 26 and 28. The motor 21 is driven by the circuit 20 to cause the pickup arm 22 to travel in a direction determined by the polarity of the manual feeding signal and at a speed related to the magnitude of this signal. As such, the pickup arm 22 is moved to a required position. Needless to say, the photoelectric detector 1 is simultaneously controlled of its movement in accordance with the movement of the pickup arm. When the pickup arm 22 is located at a desired position and when the manipulating means is released from the operator, the movable contact 28c of the selector switch 28 is automatically returned to the other fixed contact 28a, and the pickup arm lifter 32 is driven again by the driver circuit 29 and moved downwardly, causing the pickup arm 22 to descend onto the surface of the record disk. Then, the pickup arm is allowed to perform the tracing of the record groove in the automatic mode.

By providing some additional means, the present embodiment will provide for automatic repetition playing of a record disk. The operation thereof will be explained as follows.

Automatic repeating operation is first designated by manipulation of an associated REPEAT button switch, and then, the START button switch 31 is depressed to initiate the automatic playing. When a complete tracing of the record disk has been performed, and if the repeating is still designated, the pickup arm will be positioned again at the initial lead-in position on the record disk 3, and another tracing of the record disk will be started once again. Such automatic repeating operation may be stopped by either re-depressing the REPEAT button switch to re-set it or by depressing the CUT button switch 34. The above-mentioned repeating operation is included in the flow chart of FIG. 4.

Figure 6:
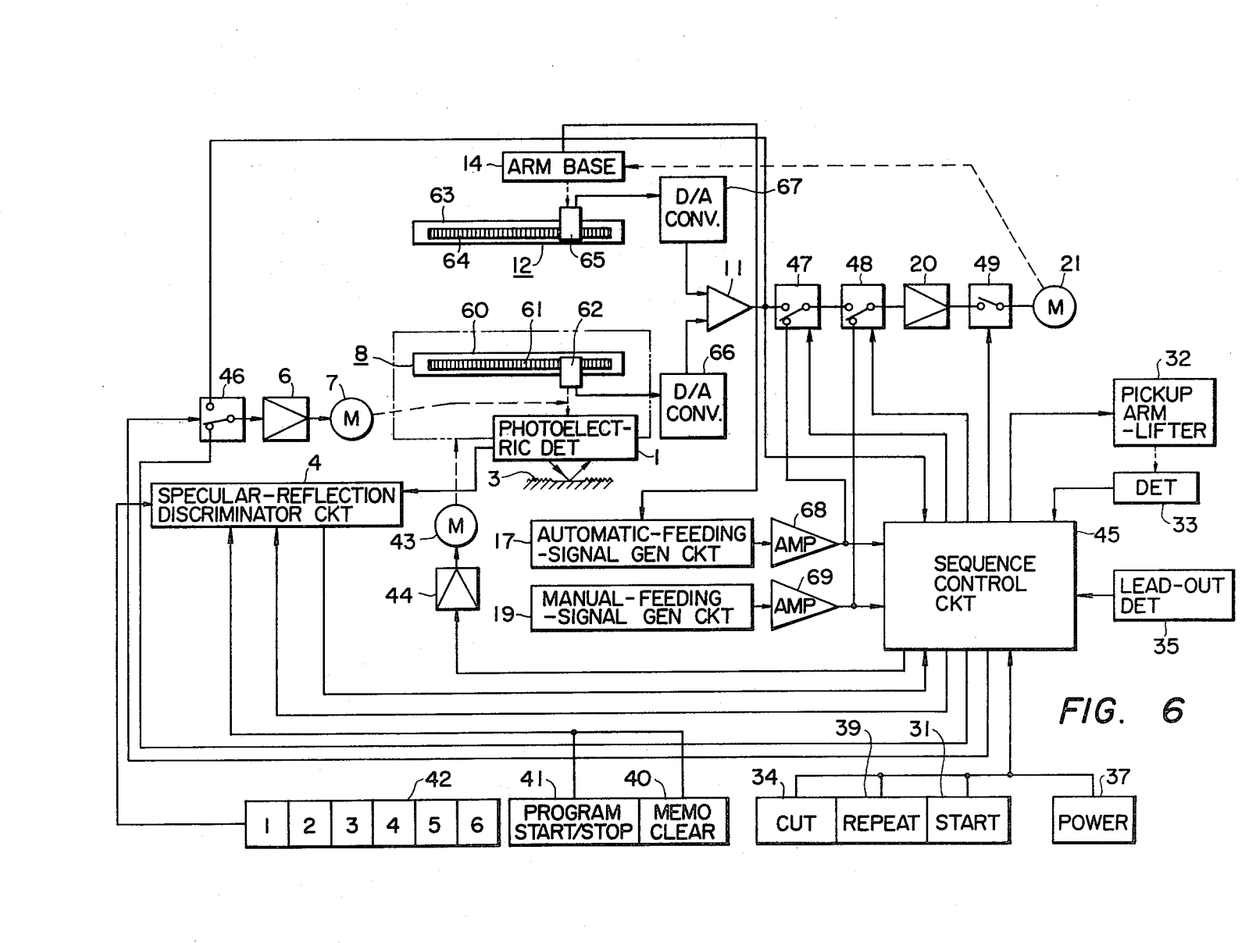
FIG. 6 is a block diagram showing another concrete embodiment of pickup arm movement control system of the present invention for allowing programmed performances of the record player.

Another concrete embodiment of a pickup-arm movement control system according to the present invention is shown in FIG. 6, which is arranged to provide a program-controlled record playing as well as other automatic modes of record disk playing.

In this embodiment, the position detector 8 for detecting the position of the photoelectric detector 1 is arranged in the form of magnetic encoder which comprises a plate 60 which bears a magnetic code pattern 61 and a magnetic sensor 62 consisting of, for example, Hall-effect devices. The magnetic sensor 62 is ganged to the photoelectric detector 1 and moves along the plate 60, scanning the magnetic code pattern 61. Hence, the magnetic sensor 62 produces a digital code signal representing the position of the detector 1 relative to the turntable. Similarly, the other position detector 12 assigned for position-detection of the pickup arm is composed of a magnetic encoder which consists of a plate 63 having a magnetic code pattern 64 provided thereon and a magnetic sensor 65 ganged to the pickup arm carriage 14. The magnetic sensor 65 moves while scanning the magnetic code pattern 64 in accordance with the movement of the arm carriage 14, and it delivers out a digital code signal representative of the relative position of the pickup arm with respect to the turntable of the record player. Both digital outputs of the position detectors 8 and 12 are converted to corresponding analog voltages by digital-to-analog converters 66 and 67, before being fed to the respective inputs of the servo-amplifier 11. Of course, the respective position detectors 8 and 12 may be formed as a kind of a photoelectric encoder which uses an optical code pattern and a photoelectric sensor.

The output of the servo-amplifier 11 is coupled to the input of the motor driver amplifier 20 for driving the motor 21 via a string of switches 47 and 48. Between the driver amplifier 20 and the motor 21 is connected to a switch 49 in series. The output of the servo-amplifier 11 is supplied also to a sequence control circuit 45, and to one of the fixed contacts of a selector switch 46 whose other fixed contact is applied with an automatic lead-in signal from the sequence control circuit 45. The movable contact of the selector switch 46 is connected to the input terminal of the motor driver amplifier 6 for driving the motor 7. The switch 47 is a selector switch having two fixed contacts, one of which is applied with an automatic-feeding signal from the automatic-feeding-signal generator circuit 17 through an amplifier 68. The other fixed contact of this selector switch 47 is coupled to the output of the servo-amplifier 11. Also, the switch 48 is a selector switch with two fixed contacts and a common movable contact. One of the two fixed contacts is coupled to the movable contact of the preceding selector switch 47, and the other is connected to the output of an amplifier 69 provided for amplifying the manual feeding signal delivered from the manual-feeding-signal generator circuit 19. The movable contact of the selector switch 48 is coupled to the input terminal of the driver amplifier 20. The switch 49 is an on/off switch. The respective switches 46, 47, 48 and 49 are under the control of the sequence control circuit 45.

The specular-reflection discriminator circuit 4 has its functions such as those explained in connection with the previous embodiment, and it further includes a program memory (MEMO) and a counter register (REG) used for performing such program-controlled playing as will be explained later in detail. Numeral 42 indicates a key-switch arrangement having six keys labeled with their designating numbers. This key-switch arrangement 42 is used to load, in individual storage locations of the program memory included in the circuit 4, the numerical designations (sound-track numbers) of desired discrete sound tracks of a record disk in the order in which the sound tracks are to be played. The contents of the program memory (MEMO) can be cleared by depressing a MEMORY CLEAR button switch 40. Numeral 41 represents a PROGRAM START/STOP button switch which is depressed to direct, via the circuit 4, the sequence control circuit 45 to initiate or interrupt a program-controlled playing. The depression of the switch 41 also serves to re-set the counter register (REG). Numeral 37 indicates the power switch of the record player. Numeral 39 indicates the REPEAT button switch as has been mentioned in connection with the preceding embodiment. Numerals 43 and 44 denote a motor and a driver amplifier for driving the motor 43, and they are provided to actuate the lever 2 (see FIG. 3) which supports the photoelectric detector 1.

Other parts are similar to corresponding parts in the previous embodiment, but they are operative in association with the sequence control circuit 45.

The operation of this instant embodiment will hereunder be explained. Explanation will first be made of ordinary automatic operation including the automatic lead-in and automatic return of the pickup arm. The power switch 37 is operated to connect the record player to a power supply. A record disk to be played is placed on the turntable, and then the proper speed of rotation of the turntable is set by manipulating the rotation-speed setting means (not shown). Upon depression of the START button switch 31, the sequence control circuit 45 will supply a signal to the motor driver amplifier 44, so that the lever 2 (see FIG. 3) is actuated by the motor 43 and will be brought to a position pointing to the center of the turntable. Then, the sequence control circuit 45 begins to supply the automatic lead-in signal to the motor driver amplifier 6 via the selector switch 46 whose movable contact is now positioned to the lower fixed contact thereof (see FIG. 6). The motor 7 is driven to rotate in the forward direction so that the photoelectric detector 1 is moved toward the center of the turntable. In this state, the selector switches 47 and 48 are controlled by the sequence control circuit 45 so as to transmit the output of the servo-amplifier 11 to the motor driver amplifier 20, and the switch 49 is turned on. Therefore, the motor 21 is driven in response to the output of the servo-amplifier 11, so that the arm carriage 14 is moved in synchronism with the movement of the photoelectric detector 1. When the photoelectric detector 1 reaches and detects the outermost unmodulated space (lead-in location) on the record disk, and when this fact is recognized in the circuit 4, a signal is delivered out from the circuit 4, and it is fed to the sequence control circuit 45. Upon receipt of this signal, the circuit 45 will supply a signal for driving the pickup arm lifter 32, and changes-over the connections of the selector switches 46, 47 and 48. The pickup arm lifter 32 descends, and causes the pickup arm to softly land on the surface of the record disk. Thus, an initial automatic lead-in operation by the pickup arm onto the disk surface is performed, and the pickup arm is ready for starting the tracing of the record groove.

During the tracing of the record groove, the motor 21 is driven in accordance with the automatic feeding signal supplied from the automatic-feeding-signal generator circuit 17 and also amplified by both of the amplifiers 68 and 20. Thus, the pickup arm is moved jointly with the arm base 14 in synchronism with the rotation of the record disk, while being kept substantially tangential to the record groove. Through the control action by the mechanism containing the parts 6, 7, 8, 11, 12, 46, 66 and 67, the photoelectric detector 1 is controlled also of its movement, so that it assumes the same relative position to the turntable as that assumed by the pickup arm.

Thereafter, when the pickup arm arrives at the lead-out position in the innermost unmodulated space on the record disk, and when this fact is detected by the lead-out detector 35, the sequence control circuit 45 will de-energize the pickup arm lifter 32. This lifter 32, accordingly, will ascend to uplift the pickup arm off the record disk surface. When the ascension of the pickup arm lifter 32 to its uplifted position is detected by the detector 33, and when this fact is transmitted to the sequence control circuit 45, the latter will switch over to the return operation mode. Namely, the return signal is supplied from the circuit 45 to the motor driver amplifier 20 via the selector switch 48 so as to cause the motor 21 to rotate in the reverse direction. Accordingly, the arm base 41 carrying the pickup arm will move away from the turntable, and the pickup arm is returned back to its rest position. On the other hand, the motor 7 is driven by the driver amplifier 6 in accordance with the output of the servo-amplifier 11, and will rotate in the reverse direction, so that the photoelectric detector 1 is also returned back to its initial position on the lever 2. Thereafter, the sequence control circuit 45 drives, through the motor driver circuit 44, the motor 43 so as to return the lever 2 back to the position shown by the imaginary lines (see FIG. 3).

If the CUT button switch 34 is depressed during the midst of tracing the record disk, the sequence control circuit 45 will immediately interrupt the tracing of the record disk, and will start the above-described return operation.

When the REPEAT button switch 39 is depressed, the return operation of the pickup arm and of the photoelectric detector is automatically followed by the playing of the record disk in such manner as explained above. In this case, however, the returning of the lever 2 does not take place.

Figure 7:
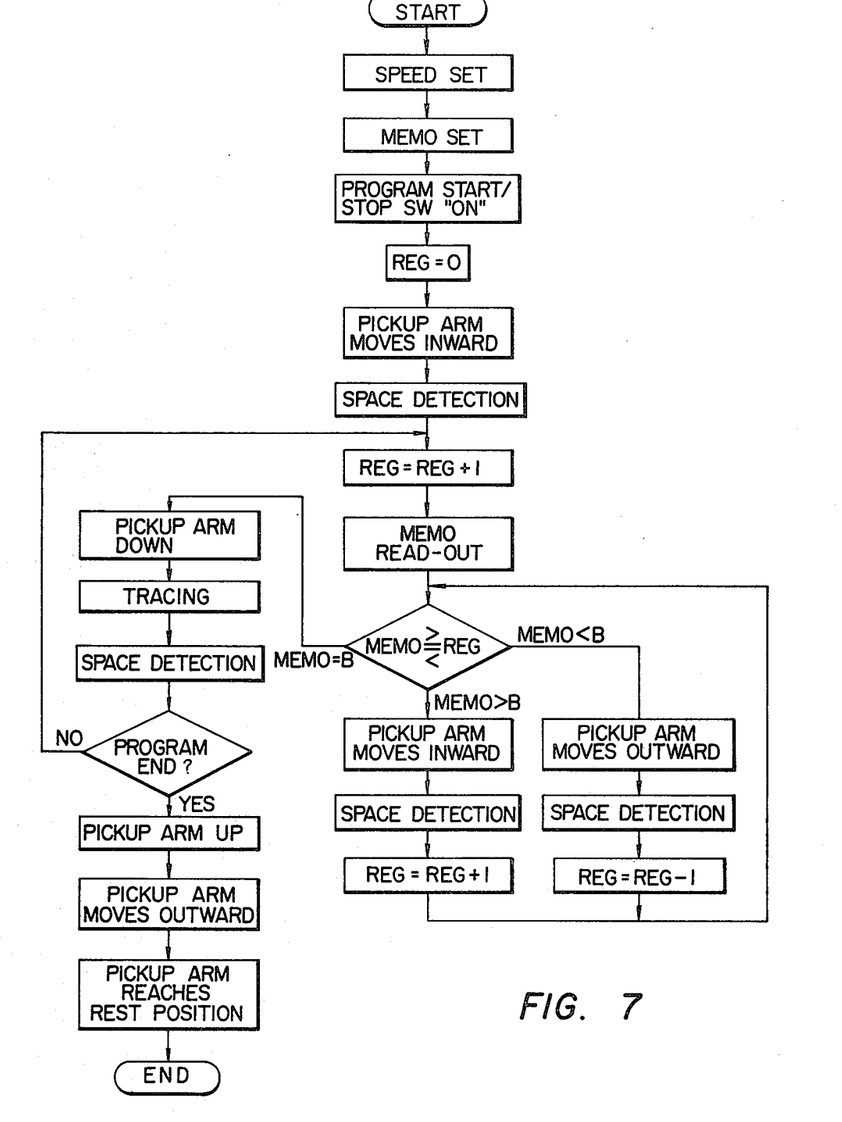
FIG. 7 is a flow chart for explaining the operations performed by the embodiment shown in FIG. 6.

Now, the program-controlled playing performed by the record player will be explained below by referrring to a flow chart of FIG. 7.

After designating the rotation speed of the turntable and after depressing the MEMORY CLEAR button switch 40 to clear the program memory, the numerical designations of required order of sound tracks on the record disk are caused to be stored in the program memory (MEMO) by depression of the desired associated keys of the key-switch arrangement 42. For example, keys numbered "1", "3", "2", "5", . . . are depressed in this order. Thereafter, the PROGRAM START/STOP button switch 41 is depressed. Whereupon, the counter register (REG) is cleared and the sequence control circuit 45 is actuated to start the program-controlled mode of operation.

First, the lever 2 carrying the photoelectric detector 1 is moved to the position shown by the solid lines (see FIG. 3). Then, the photoelectric detector 1 is moved toward the turntable from the rest position. The pickup arm also moves toward the center of the turntable. When the detector 1 arrives at the outermost unmodulated space on the record disk surface and when this is detected by the specular-reflection discriminator circuit 4, the content of the counter register is incremented by one. This content "1" and the content of the first storage location in the program memory are referred to by the sequence control circuit 45 and compared with each other. In this instant example, the first memory location contains "1" as the numerical designation of the first sound track on the record disk, so that the sequence control circuit 45 drives the pickup arm lifter 32 to cause the pickup arm to land on the record disk surface. Then, the pickup arm is controlled of its movement in accordance with the automatic feeding signal delivered from the circuit 17 in order to trace the first sound track on the disk.

When the playing of the first sound track has been completed and when the photoelectric detector 1 as well as the pickup arm arrive at the second unmodulated space after passing the first sound track of the disk, the counter register is incremented by one and updated to "2". This content "2" is compared with the content of the second storage location in the program memory by the sequence control circuit 45. In this example, such comparison condition will not be satisfied because the second memory location contains "3". Hence, the sequence control circuit 45 stops the driving of the pickup arm lifter 32 to uplift the pickup arm, and interrupts the tracing of the record disk. Then, the lead-in signal is supplied from the circuit 45 to the motor driver amplifier 6 via the selector switch 46 in order to further move the photoelectric detector as well as the pickup arm toward the center of the turntable. At the instance that the photoelectric detector 1 arrives at the third unmodulated space on the record disk, the counter register is incremented by one and this content "3" is compared with the content of the second storage location in the program memory at the sequence control circuit 45. In this case, the comparison is established and therefore, the circuit 45 drives again the pickup arm lifter 32 so that the pickup arm is caused to descend onto the record disk surface to trace the third sound track of the record disk.

Thereafter, when the photoelectric detector 1 and the pickup arm arrive at the fourth unmodulated space after passing the third sound track just played, the counter register is incremented by one to attain "4", and this new content of the register is compared with the content of the third storage location in the program memory by the circuit 45. In this case, the content of the register "4" is not equal to but is larger than the content of the third memory location "2", so that the circuit 45 de-energizes the pickup arm lifter 32 to lift up the pickup arm from the record surface. Then, the lead-in signal having a reversed polarity is supplied from the circuit 45 to the motor driver amplifier 6 for driving the motor 6 in a reverse direction. Thus, the photoelectric detector 1 and accordingly the pickup arm are moved away from the center of the turntable. During this reverse movement, the counter register is decremented by one each time the photoelectric detector 1 detects an unmodulated space on the disk (the second and third unmodulated spaces in this case).

At the arrival of the photoelectric detector as well as of the pickup arm at the second unmodulated space between the first and second sound tracks on the disk, the content of the register becomes coincident with the content of the third storage location in the program memory. Accordingly, under the control of the circuit 45, the pickup arm will again make a landing onto the record disk surface to perform the tracing of the second sound track when the pickup arm is under the automatic feeding control mode in accordance with the automatic feeding signal delivered from the circuit 17.

In this way, the record player automatically plays the respective sound tracks on the record disk in the order in which they have been designated.

Such sequence of operation will be terminated when a storage location in the program memory which contains a "0" therein is referred to by the sequence control circuit or when the PROGRAM START/STOP button switch 41 or the CUT button switch 34 is depressed.

Though the present invention has been explained in conjunction with the embodiments used in a linear-tracking-type automatic record player, it will of course be understood by those skilled in this technical field that the present invention can be applied similarly to other types of automatic record players.

What is claimed is:

1. A system for controlling the movement of a pickup arm of a record player in a plane parallel a surface of a turntable on said record player, which comprises, in combination:
   first driving means for driving said pickup arm in a predetermined course of movement relative to a turntable of said record player;
   photoelectric means for optically detecting unmodulated spaces of a surface of a record disk placed on said turntable;
   second driving means for driving said photoelectric means in another predetermined course of movement relative to said turntable;
   first position detecting means for detecting a position of said pickup arm relative to said turntable and producing a first signal representing the detected relative position of said pickup arm;
   second position detecting means for detecting a position of said photoelectric means relative to said turntable and producing a second signal representing the detected position of said photoelectric means;
   circuit means for receiving the first and second signals produced by said first and the second position detecting means and producing a third signal representing the difference between the first and second signals received;
   pickup arm drive signal generating means for generating a first control signal for controlling said first driving means;
   photoelectric means drive signal generating means for generating a second control signal for controlling said second driving means;
   first switching means for supplying the third signal produced by said circuit means to selected one of said first and second driving means;
   second switching means for selectively applying said first control signal from said pickup arm drive signal generating means to said first driving means;
   third switching means for selectively applying said second control signal from said photoelectric means drive signal generating means to said second driving means; and
   switching means driver for controlling said first, second and third switching means, said switching means driver being operative so that:
   in a first state, said first switching means is controlled to supply said third signal to said first driving means, said second switching means is controlled to not supply said first control signal to said first driving means, and said third switching means is controlled to supply said second control signal to said second driving means, wherein movement of said pickup arm is controlled by said first driving means to assume a position with respect to said turntable corresponding to a position assumed by said photoelectric means; and
   in a second state, said first switching means is controlled to supply said third signal to said second driving means, said second switching means is controlled to supply said first control signal to said first driving means, and said third switching means is controlled to not supply said second control signal to said second driving means, wherein movement of said photoelectric means is controlled by said second driving means to assume a position with respect to said turntable corresponding to a position assumed by said pickup arm.

2. A pickup arm movement control system for controlling the movement of a pickup arm of a record player, which comprises, in combination:
   first driving means for driving said pickup arm to move it in a predetermined course of movement relative to a turntable of said record player;
   photoelectric means for optically detecting unmodulated spaces of a surface of a record disk placed on said turntable;
   second driving means for driving said photoelectric means to move it in another predetermined course of movement relative to said turntable;
   first position detecting means for detecting a position of said pickup arm relative to said turntable and producing a first signal representing the detected relative position of said pickup arm;
   second position detecting means for detecting a position of said photoelectric means relative to said turntable and producing a second signal representing the detected relative position of said photoelectric means;
   circuit means for receiving the first and second signals produced by said first and the second position detecting means and producing a third signal representing the difference between the first and second signals received;
   pickup arm drive signal generator for generating a first control signal for controlling said first driving means;
   photoelectric means drive signal generator for generating a second control signal for controlling said second driving means;
   pickup arm lifter means for holding said pickup arm at an uplifted position off the surface of the record disk and allowing said pickup arm to descend onto the record disk;
   pickup arm lifter means drive signal generator for generating a third control signal for controlling said pickup arm lifter means in response to the detection of said photoelectric means;
   first switching means for supplying the third signal produced by said circuit means to selected one of said first and second driving means;
   second switching means for switching a transmitting of said first control signal from said pickup arm drive signal generator to said first driving means;
   third switching means for switching a transmitting of said second control signal from said photoelectric means drive signal generator to said second driving means; and
   switching means driver for controlling said first to third switching means, said switching means driver being operative so that:
   in a first state, until the photoelectric means arrives at and detects a required unmodulated space on the record disk surface and delivers a corresponding detection signal, said first switching means is controlled to supply said third signal to said first driving means, said second switching means is controlled to not supply said first control signal to said first driving means, and said third switching means is controlled to supply said second control signal to said second driving means, wherein movement of said pickup arm is controlled by said first driving means to assume a position with respect to said turntable corresponding to a position assumed by said photoelectric means;

in a second state, during which said pickup arm traces a groove of the record disk, said first switching means is controlled to supply said third signal to said second driving means, said second switching means is controlled to supply said first control signal to said first driving means, and said third switching means is controlled to not supply said second control signal to said second driving means, wherein movement of said photoelectric means is controlled by said second driving means to assume a position with respect to said turntable corresponding to a position assumed by said pickup arm;

said pickup arm lifter means controlling said pickup arm so as to be at an uplifted position in said first state, and to be at a descended position in said second state; and said pickup arm lifter means being controlled to cause to lower said pickup arm onto the record disk surface by said third control signal from said pickup arm lifter means drive signal generator when the photoelectric means arrives at and detects a required unmodulated space on the record disk surface and delivers a corresponding detection signal.

3. A pickup arm movement control system according to claim 2, further comprising lead-out detecting means for detecting the arrival of said pickup arm at the innermost unmodulated space on the record disk surface and delivering a corresponding detection signal, and a second circuit causing said first driving means to return said pickup arm back to a rest position located away from said turntable after said detection signal is delivered by said lead-out detecting means, said pickup arm lifter means uplifting said pickup arm off the record disk after said detection signal is delivered by said lead-out detecting means.

4. A pickup arm movement control system according to claim 3, wherein:

said system further comprises return-signal generating means for generating a return-signal being supplied to said first driving means to return said pickup arm back to a rest position located away from said turntable;

said switching means driver being further operative so that:

in a third state after said detection signal is generated by said lead-out detecting means, said first switching means is controlled to not supply said third signal to said first and second driving means, said second switching means is controlled to not supply said first control signal to said first driving means, and said third switching means is controlled to not supply said first control signal to said first driving means, and said third switching means is controlled to supply said second control signal to said second driving means, wherein movement of said pickup arm is controlled by said return-signal, and movement of said photoelectric means is controlled by said second driving means to assume a position with respect to said turntable corresponding to a position assumed by said pickup arm; and said pickup arm lifter means controls said pickup arm so as to be at an uplifted position in said third state.

5. A pickup arm movement control system for controlling the movement of a pickup arm of a record player, which comprises, in combination:

first driving means for driving said pickup arm in a predetermined course of movement relative to a turntable of said record player;

photoelectric means for optically detecting unmodulated spaces of a surface of a record disk placed on said turntable;

second driving means for driving said photoelectric means in another predetermined course of movement relative to said turntable;

first position detecting means for detecting a position of said pickup arm relative to said turntable and producing a first signal representing the detected relative position of said pickup arm;

second position detecting means for detecting a position of said photoelectric means relative to said turntable and producing a second signal representing the detected relative position of said photoelectric means;

circuit means for receiving the first and second signals produced by said first and the second position detecting means and producing a third signal representing the difference between the first and second signals received;

pickup arm drive signal generating means for generating a first control signal for controlling said first driving means;

photoelectric means drive signal generating means for generating a second control signal for controlling said second driving means;

pickup arm lifter means for holding said pickup arm at an uplifted position off the surface of the record disk and allowing said pickup arm to descend onto the record disk;

pickup arm lifter means drive signal generator for generating a third control signal for controlling said pickup arm lifter means in response to the detection of said photoelectric means;

first switching means for supplying the third signal produced by said circuit means to selected one of said first and second driving means;

second switching means for selectively applying said first control signal from said pickup arm drive signal generating means to said first driving means;

third switching means for selectively applying said second control signal from said photoelectric means drive signal generating means to said second driving means; and switching means driver for controlling said first, second and third switching means, said switching means driver being operative so that:

in a first state, said first switching means is controlled to supply said third signal to said first driving means, and said second switching means is controlled to not supply said first control signal to said first driving means, and said third switching means is controlled to supply said second control signal to said second driving means, wherein movement of said pickup arm is controlled by said first driving means to assume a position with respect to said turntable corresponding to a position assumed by said photoelectric means; and in a second state, said first switching means is controlled to supply said third signal to said second driving means, and said second switching means is controlled to supply said first control signal to said first driving means, and said third switching means is controlled to not supply said second control signal to said second driving means, wherein movement of said photoelectric means is controlled by said second driving means to assume a position with respect to said turntable corresponding to a position assumed by said pickup arm;

said pickup arm lifter means controlling said pickup arm so as to be at an uplifted position in said first state, and to be at a descended position in said second state.

6. A pickup-arm movement control system according to claim 1, 3, 2, 4 or 5, in which:

said first position detecting means comprises a potentiometer having a pair of terminals across which a voltage is applied, and a slider tap ganged to said pickup arm and producing said first signal; and said second position detecting means comprises a potentiometer having a pair of terminals across which is applied a voltage, and a slider tap ganged to said photoelectric means and producing said second signal.

7. A pickup arm movement control system according to claim 1, 3, 2, 4 or 5, in which:

said first position detecting means comprises a digital encoder consisting of a code pattern, and a sensor ganged to said pickup arm and scanning this code pattern to produce a digital signal representing the position of the pickup arm relative to said turntable, and a digital-to-analog converter converting this digital signal to a corresponding analog signal; and said second position detecting means comprises a digital encoder consisting of a code pattern, and a sensor ganged to said photoelectric means and scanning this code pattern to produce a digital signal representing the position of said photoelectric means with respect to said turntable, and a digital-to-analog converter converting this digital signal to a corresponding analog signal.

8. A pickup arm movement control system according to claim 1, 3, 2, 4 or 5, in which: said first switching means comprises a selector switch having a first fixed contact coupled to said first driving means, a second fixed contact coupled to said second driving means, and a movable contact coupled to said circuit means and actuated by said control means.

9. A method for controlling the movement of a pickup arm of a record player in a plane parallel a surface of a turntable on said record player, comprising the steps of:

optically detecting unmodulated spaces of a surface of a record disk placed on said turntable with photoelectric means;

detecting a position of said pickup arm relative to to said turntable and producing a first signal representing the detected relative position of said pickup arm;

detecting a position of said photoelectric means relative to said turntable and producing a second signal representing the detected relative position of said photoelectric means;

producing a third signal representing the difference between the first and second signals received;

generating a first control signal for controlling the movement of said pickup arm;

generating a second control signal for controlling the movement of said photoelectric means;

(a) controlling the movement of a selected one of said pickup arm and photoelectric means with said third signal;

(b) selectively controlling said pickup arm in response to said first control signal;

(c) selectively controlling said photoelectric means in response to said second control signal; and enabling said (a), (b) and (c) controlling steps, said enabling step being operative so that:

in a first state, said (a) controlling step supplies said third signal to control the movement of said pickup arm, said (b) controlling step means does not supply said first control signal to control the movement of said pickup arm, and said (c) controlling step supplies said second control signal to control the movement of said photoelectric means, wherein movement of said pickup arm is controlled to assume a position with respect to said turntable corresponding to a position assumed by said photoelectric means; and in a second state, said (a) controlling step supplies said third signal to control the movement of said photoelectric means, said (b) controlling step supplies said first control signal to control the movement of said pickup arm, and said (c) controlling step does not supply said second control signal to control the movement of said photoelectric means; wherein movement of said photoelectric means is controlled to assume a position with respect to said turntable corresponding to a position assumed by said pickup arm.

10. A method for controlling the movement of a pickup arm of a record player comprising the steps of:

optically detecting unmodulated spaces of a surface of a record disk placed on said turntable with photoelectric means;

detecting a position of said pickup arm relative to said turntable and producing a first signal representing the detected relative position of said pickup arm;

detecting a position of said photoelectric means relative to said turntable and producing a second signal representing the detected relative position of said photoelectric means;

producing a third signal representing the difference between the first and second signals received;

generating a first control signal for controlling the movement of said pickup arm;

generating a second control signal for controlling the movement of said photoelectric means;

(a) controlling the movement of a selected one of said pickup arm and photoelectric means with said third signal;

(b) selectively controlling said pickup arm in response to said first control signal;

(c) selectively controlling said photoelectric means in response to said second control signal;

enabling said (a), (b), and (c) controlling steps, said enabling step being operative so that:

in a first state, said (a) controlling step supplies said third signal to control the movement of said pickup arm, said (b) controlling step does not supply said first control signal to control the movement of said pickup arm, said (c) controlling step supplies said second control signal to control the movement of said photoelectric means, wherein movement of said pickup arm is controlled to assume a position with respect to said turntable corresponding to a position assumed by said photoelectric means; and in a second state, said (a) controlling step supplies said third signal to control the movement of said photoelectric means, and said (b) controlling step supplies said first control signal to control the movement of said pickup arm, and said (c) controlling means does not supply said second control signal to control the movement of said photoelectric means, wherein movement of said photoelectric means is controlled to assume a position with respect to said turntable corresponding to a position assumed by said pickup arm; and raising said pickup in said first state, and lowering said pickup arm in said second state.

* * * * *